United States Patent
Willner

(10) Patent No.: US 9,102,880 B2
(45) Date of Patent: Aug. 11, 2015

(54) THERMOCHEMICAL CONVERSION OF BIOMASS

(75) Inventor: Thomas Willner, Hamburg (DE)

(73) Assignee: NEXXOIL AG, Zurich (CH)

( * ) Notice: Subject to any disclaimer, the term of this patent is extended or adjusted under 35 U.S.C. 154(b) by 793 days.

(21) Appl. No.: 13/380,298

(22) PCT Filed: Jun. 22, 2010

(86) PCT No.: PCT/DE2010/000706
§ 371 (c)(1), (2), (4) Date: Mar. 12, 2012

(87) PCT Pub. No.: WO2010/149138
PCT Pub. Date: Dec. 29, 2010

(65) Prior Publication Data
US 2012/0167453 A1   Jul. 5, 2012

(30) Foreign Application Priority Data
Jun. 26, 2009   (DE) .......................... 10 2009 030 809

(51) Int. Cl.
| | | |
|---|---|---|
| C10L 1/10 | (2006.01) | |
| C10L 1/00 | (2006.01) | |
| C10G 3/00 | (2006.01) | |
| C10G 1/02 | (2006.01) | |
| B01J 29/70 | (2006.01) | |

(52) U.S. Cl.
CPC .. *C10G 3/40* (2013.01); *C10G 1/02* (2013.01); *C10G 3/60* (2013.01); *B01J 29/7003* (2013.01); *C10G 2300/1014* (2013.01); *C10G 2300/1018* (2013.01); *Y02E 50/14* (2013.01)

(58) Field of Classification Search
CPC ................. B01J 29/7003; C10G 1/02; C10G 2300/1014; C10G 3/40; C10G 3/60; Y02E 50/14
USPC ....................................................... 44/300, 307
See application file for complete search history.

(56) References Cited

U.S. PATENT DOCUMENTS
| | | | | |
|---|---|---|---|---|
| 2,349,224 A | * | 5/1944 | Nill ............................ | 508/152 |
| 4,309,191 A | * | 1/1982 | Hiroya et al. ............... | 44/281 |
| 2008/0072478 A1 | | 3/2008 | Cooper | |

FOREIGN PATENT DOCUMENTS
| | | | |
|---|---|---|---|
| JP | 2006-63310 A | | 3/2006 |
| JP | 2006063310 A | * | 3/2006 |

OTHER PUBLICATIONS

English Translation of JP 2006-063310A.*
International Search Report of PCT/DE2010/000706 (Dec. 3, 2010).
A. Demirbas et al., "Effect of Lignin Content on Aqueous Liquefaction Products of Biomass", Energy Conversion & Management, vol. 41, No. 15 (2000) pp. 1601-1607.

(Continued)

*Primary Examiner* — James Goloboy
*Assistant Examiner* — Latosha Hines
(74) *Attorney, Agent, or Firm* — Millen, White, Zelano, Branigan, P.C.

(57) ABSTRACT

The invention relates to a method for producing crude oil from biomass by direct liquefaction under atmospheric pressure, involving the following steps: introducing dried biomass into a reactor containing heavy oil to form a sump oil phase consisting of biomass and heavy oil; maintaining the temperature of the sump oil phase at a predetermined reaction temperature; condensing and collecting the volatile reaction products; and isolating and collecting the crude oil. Said method is characterized in that the heavy oil phase has at least 5 wt. % organically bound oxygen.

17 Claims, 2 Drawing Sheets

(56) References Cited

OTHER PUBLICATIONS

Figure 1:
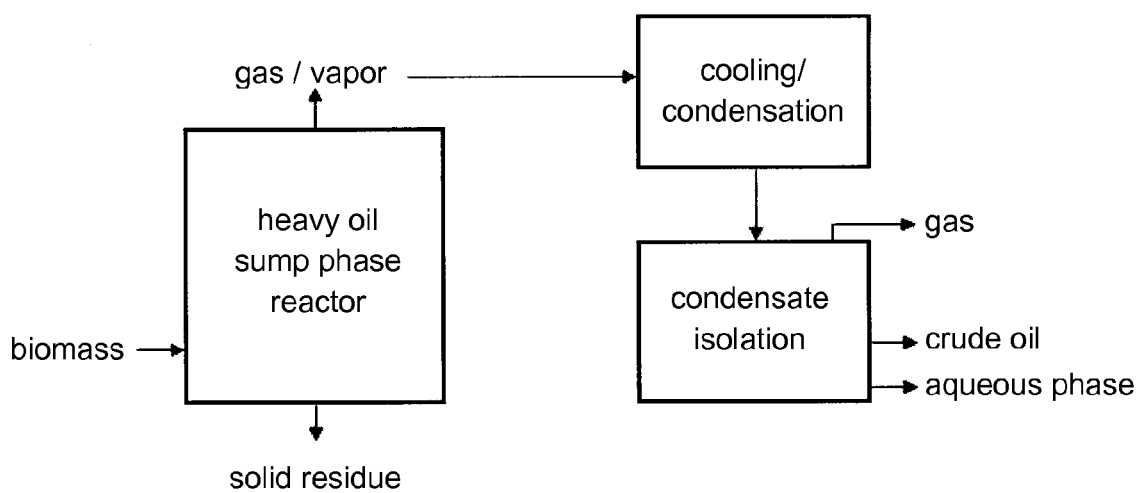

Z. Liu et al., "Effects of Various Solvents on the Liquefaction of Biomass to Produce Fuels and Chemical Feedstocks", Energy Conversion and Management, vol. 49, No. 12 (2008) pp. 3498-3504.

F. Behrendt, "Direktverfluessigung von Biomasse—Reaktionsmechanismen und Produktverteilungen Ionsmechanismen und Produktverteilungen", Internet Citation (Jun. 8, 2006) XP007902530.

* cited by examiner

| Nr. | R.T. | Name | Molecular formula | Structure |
|---|---|---|---|---|
| 1 | 8.337 | Acetic acid | $C_2H_4O_2$ | |
| 2 | 39.531 | Phenol, 4-ethyl-2-methoxy- | $C_9H_{12}O_2$ | |
| 3 | 38.323 | Phenol, 4-ethyl- | $C_8H_{10}O$ | |
| 4 | 30.851 | Phenol, 2-methoxy- | $C_7H_8O_2$ | |
| 5 | 9.871 | (Acetol) 2-Propanone, 1-hydroxy- | $C_3H_6O_2$ | |
| 6 | 6.135 | 2-Butanone | $C_4H_8O$ | |
| 7 | 43.257 | Phenol, 2-methoxy-4-propyl- | $C_{10}H_{14}O_2$ | |
| 8 | 51.020 | Phenol, 4-ethyl-2,6-dimethoxy | $C_{10}H_{14}O_3$ | |
| 9 | 54.029 | n.i. | | |
| 10 | 28.289 | 2-Cyclopenten-1-one, 2-hydroxy-3-methyl- | $C_6H_8O_2$ | |

THERMOCHEMICAL CONVERSION OF BIOMASS

The invention relates to a method for processing biomass and biogenic residues to crude oils.

The term biomass designates the entirety of the mass of organic materials including those contained in biogenic residues and sewage sludges.

Plant biomass is composed essentially of the three biopolymers cellulose, hemicelluloses (also called polyoses) and lignin. Their share in wood in the moderate temperate zones is usually 97-99% of the wood substance. 30-35% thereof is cellulose, 15-35% is hemicellulose and 20-35% is lignin. Considerably smaller portions have extract substances (1-3%) and inorganic components (ash) (0.1-0.5%). In general, the lignin proportion in softwoods is higher than in hardwoods; in hardwoods, the hemicellulose proportion is slightly higher.

The conversion of biomass into oxygen-containing crude oils as liquid intermediate products occurs in the simplest way by the so-called direct liquefaction. Direct liquefaction is a one-step low-temperature conversion in the range between 250 and 550° C. In principle, the following products are created thereby:

- a liquid condensate phase containing the crude oil as the target product and the reaction water,
- a combustible gas phase as a side product and
- a solid residue as a side product.

In favorable cases, hydrophobic crude oil is generated, i.e. the crude oil cannot be mixed with water, and in contact with water at least two liquid phases that cannot be mixed are formed, namely an oil phase and a water phase.

The quality of the crude oil is determined by the so-called calorific value. The calorific value is the maximally usable amount of heat generated by combustion, without a condensation of the water vapor contained in the exhaust gas, referred to the amount of the consumed fuel. A high proportion of oxygen in the fuel has a negative effect on the calorific value ($H_i$), as can be seen in the following formula:

$$H_i = (34.0 \cdot m(C) + 101.6 \cdot m(H) + 6.3 \cdot m(N) + 19.1 \cdot m(S) - 9.8 \cdot m(O) - 2.5 \cdot m(H_2O)) \text{ MJ/kg}$$

Herein m(C), m(H), m(N), m(S), m(O) and m($H_2O$) are the percentage mass portions of carbon, hydrogen, nitrogen, sulfur, oxygen and water, respectively, divided by 100.

A very comprehensive description of all existing methods for the direct liquefaction can be found in the study "Direktverflüssigung von Biomasse—Reaktionsmechanismen and Produktverteilungen" (Direct Liquefaction of Biomass—Reaction Mechanisms and Product Distributions)—114-50-10-0337/05-B by Prof. Dr. Frank Behrendt.

The historic Pittsburg Energy Research Center (PERC) method is carried out under very high pressure of approx. 200 bars with an aqueous medium, dissolved catalytic converter, cycle oil and carbon monoxide-hydrogen gas mixture. The equally historic Lawrence Berkeley Laboratory (LBL) method is carried out without cycle oil, but otherwise under the same expensive conditions as the PERC method. Both methods are not carried out anymore because of the enormous complexity for technical and economical reasons.

Using the hydrolytic HTU method (hydrothermal upgrading) of SHELL, many different biomasses (even with high moisture content) can be liquefied under a very high pressure of approx. 180 bars. A tar-like oxygen-containing product is generated, which needs further processing to a liquid oil.

Under high hydrogen pressure and using expensive noble metal catalytic converters, the direct catalytic pressure liquefaction according to the BFH method is carried out.

The pressure hydrogenation method/DoS (direct liquefaction of organic substances) according to Willner is also carried out under hydrogen pressure, but without catalytic converters.

All direct liquefaction methods mentioned above, including the historic ones, occur under pressure and are thus very expensive. In particular the entry of solid biomass into the pressure reactor always poses a problem with regard to consistency of the biomass arriving in the reactor as well as with regard to feasibility, reliability and cost effectiveness of the process. Further, pressure installations are all in all more expensive and in operation more susceptible to problems than atmospheric pressure installations.

Besides, there are the following direct liquefaction methods working under atmospheric pressure:

The CPD method (catalytic pressure-less depolymerization) of Alphakat as well as Willner's variant are carried out in an oxygen-free crude oil-based heavy oil phase as a reaction medium under atmospheric pressure and need pulverized solid material catalytic converters. The latter is an economical problem, since the catalytic converters are expensive and lose their activity in the reactor very quickly by coking. Furthermore, in the CPD method, new heavy oil needs to continuously be fed, since when using biomass, the reactor sump oil phase is not automatically regenerated. Furthermore, the CPD method works with an internal heavy oil cycle that is maintained by a circulation pump. A basic problem is that the cycle oil has reaction temperature and the pumps are thereby exposed to high thermal and corrosive loads and are prone to frequent failures. For the CPD method, there is another problem caused by the solid materials load in particular because of the catalytic converter but also of the biogenic mineral substances content in the cycle oil, whereby the pumps are subject to additional abrasion loads leading to high wear and requiring expensive materials. In the CPD method, there is not formed, when using biomass, a stable and automatically regenerating sump phase, neither with nor without catalytic converter, so that new external heavy oil must continuously be fed. Besides, in the CPD method, very much solid residue and comparatively little crude oil as the target product are obtained. Furthermore, in the CPD method, up to four liquid phases that cannot be mixed can be observed in the condensate, what makes a technically reasonable operation very difficult.

Basically, the flash pyrolysis is a very quick heating process to reaction temperature under atmospheric pressure. Thereby, a high yield of crude oil occurs, which is however hydrophilic. I.e. it can be mixed with water up to a water content of approx. 35%. Therefore, the crude oil has a low quality because of its extremely low calorific value in the order of only 15 to 17 MJ/kg and because of its strong corrosiveness in particular due to a high acid content and thereby is technically difficult to use or process further.

The LTC method (low-temperature conversion) of Prof. Bayer (University Tübingen) is a simple pyrolysis method under atmospheric pressure without quick heating. This method is however not suitable for the liquefaction of plant biomass, but is mainly used for sewage sludge liquefaction. A basic problem of the LTC method is that it generates comparatively low crude oil yields only, but high yields of solid residue.

It is therefore the object of the invention to provide a method that can convert any type of biomass, of plants and animals, as well as biogenic residues including sewage sludge under atmospheric pressure, without addition of catalytic converters and without addition of heavy oils into crude oils with only low solid organic residues. In particular, it is intended to make the production of hydrophobic crude oils possible, without using an internal heavy oil cycle. It is a special object to obtain hydrophobic crude oils with a calorific value of more than 25 MJ/kg.

This object is achieved by the method having the features listed in claim 1. The subclaims represent advantageous embodiments of the invention.

The direct liquefaction method according to the invention is a one-step method, the conversion reactions being carried out under atmospheric pressure in a liquid heavy oil sump phase.

Another feature of the method according to the invention is that a stable and self-regenerating sump phase is formed, so that no new external heavy oil needs to be fed.

An essential feature of the method according to the invention is that the heavy oil sump phase in the reactor must contain at least 5 wt. % organically bound oxygen.

As heavy oil forming the sump phase, in connection with the fed biomass, for instance wood tars or wood tars with portions of tall oil can be used. Such wood tars may be softwood as well as hardwood tars.

In the method according to the invention, the crushed dried solid biomass is directly fed into the sump phase.

Therein the term biomass designates the entirety of the mass of organic materials including those contained in biogenic residues and sewage sludges.

Surprisingly, under these conditions, the object of producing hydrophobic crude oil with minimization of solid residue is achieved without the addition of catalytic converters and heavy oil, without a special conditioning of the dried biomass (for instance preheating or mashing with heavy oil) as well as without an internal heavy oil cycle.

In the method according to the invention, surprisingly and completely differently from methods not according to the invention and having an oxygen-free heavy oil phase (for instance CPD method), a stable and self-regenerating sump phase is formed, so that no new external heavy oil needs to be fed. The condensate, too, is completely different from that in methods not according to the invention and having an oxygen-free heavy oil phase (for instance CPD method). Usually, the condensate only consists of two liquid phases that cannot be mixed, the crude oil phase as the target product and an aqueous phase. In rare cases, three liquid phases are obtained, if the crude oil phase contains components that are in part lighter and in part heavier than water. In this case, the crude oil phase consists of an upper and a lower liquid phase, whereas the water phase is in the middle. An economically decisive difference from methods not according to the invention and having an oxygen-free heavy oil phase (for instance CPD method) is that by the method according to the invention much more of the crude oil product and less of the solid residue is obtained.

The calorific values of the crude oil produced by the method according to the invention are larger than/equal to 25 MJ/kg, i.e. in part above those obtained with methods not according to the invention and having an oxygen-free heavy oil phase (for instance CPD method). This is a surprising result, since the oxygen content of the sump phase should have a negative effect on the calorific value of the product oil.

FIG. 1 shows a typical sequence of the continuously operated method according to the invention in a flow diagram. The core is the heated reactor that keeps the heavy oil sump phase on reaction temperature. The crushed dried biomass is fed by a conveying member (for instance conveying worm) directly into the sump phase, where it will quickly heat up in contact with the heavy oil. The volatile reaction products leave the reactor at top through the gas/vapor phase and are cooled as well as partially condensed. The condensate is collected and the reaction gas not condensing is fed for further use (for instance combustion for energy supply of the process). In the condensate, at least two liquid phases that cannot be mixed separate from each other, i.e. at least a hydrophobic crude oil phase as the target product and an aqueous phase. The solid residue is removed for instance after sedimentation at the bottom from the reactor. For isolating the solid residue, other process steps may also be used, for instance filtration, press filtration, centrifugal separation, vacuum vaporization and/or extraction with solvents.

In the following, an example according to the invention (see Example 3) as well as two examples for a method not according to the invention are described. There are found in the CPD conditions not according to the invention, wherein an oxygen-free heavy oil phase is present, clearly different product compositions from Example 3 according to the invention.

The decisive condition therein is that the heavy oil sump phase in the reactor must contain at least 5 wt. % organically bound oxygen. Compared to the closest prior art, the CPD method, wherein the oxygen-free crude oil-based heavy oils are used as the reaction phase, there are, in spite of the comparatively small change of the composition of the sump phase, unexpectedly completely different results:

As an example of execution, the experimental conversion of crushed and dried crop straw at an 8-liter lab reactor is described. The lab reactor is externally electrically heated and contains in its interior a stirrer that keeps the heavy oil sump phase near the wall in motion, in order that there a fair heat transfer is secured. The solid biomass is fed by a conveying worm directly into the sump phase held on the reaction temperature. The volatile reaction products leave the reactor at the top and are fed to the cooling condenser. The condensate is collected and the remaining gas phase is fed to the exhaust gas cleanup system. After several hours of operation with continuous biomass supply, the experiment is terminated and all products including the sump phase are reviewed, the content of solid residue in the sump phase being analytically determined. The reaction gas product is determined as the balancing difference. All tests described her are carried out with continuous straw supply of 1 kg/h at 350° C. under atmospheric pressure. The calorific value of the straw is 15.9 MJ/kg.

EXAMPLE 1

CPD Conditions with Catalytic Converter

Catalyzer: 30% Tricat zeolite A4 suspended in the sump phase.

Sump phase heavy oil: BP Energol CS 220 (calorific value 43.0 MJ/kg, oxygen content 0%).

Result:

4 condensate phases (from top: phase 1=non-biogenic hydrocarbon phase, phase 2=light biogenic crude oil phase, phase 3=aqueous phase, phase 4=heavy biogenic crude oil phase).

Mass balance in wt. %, referred to organic dry mass of the used straw: 4% crude oil, 36% water phase, 33% solid residue, 27% gas (diff.).

Calorific value of the crude oil: 26.4 MJ/kg.

EXAMPLE 2

CPD Conditions without Catalytic Converter

Sump phase heavy oil: BP Energol CS 220 (calorific value 43.0 MJ/kg, oxygen content 0%)
Result:
4 condensate phases (from top: phase 1=non-biogenic hydrocarbon phase, phase 2=light biogenic crude oil phase, phase 3=aqueous phase, phase 4=heavy biogenic crude oil phase).
Mass balance in wt. %, referred to organic dry mass of the used straw: 12% crude oil, 33% water phase, 34% solid residue, 21% gas (diff.).
Calorific value of the crude oil: 25.9 MJ/kg.

EXAMPLE 3

Conditions According to the Invention (i.e. without Catalytic Converter)

Figure 2:
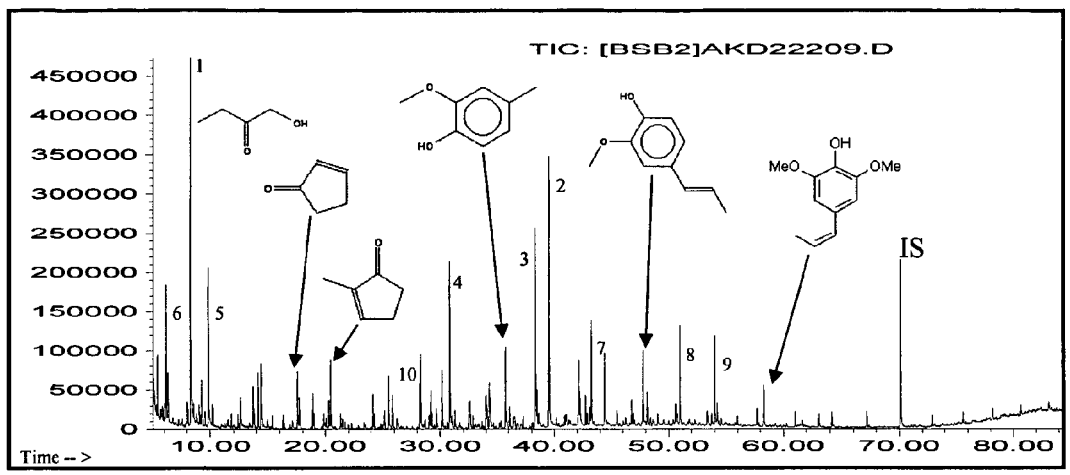

Sump phase heavy oil: Commentz softwood tar with portions of tall oil (calorific value 38.1 MJ/kg, oxygen content 9%).
Result:
2 condensate phases (from top: phase 1=biogenic crude oil phase, phase 2=aqueous phase).
Mass balance in wt. %, referred to organic dry mass of the used straw: 38% crude oil, 29% water phase, 12% solid residue, 21% gas (diff.).
Calorific value of the crude oil: 28.1 MJ/kg.
FIG. 2 shows a GC-MS analysis of the crude oil.

The invention claimed is:

1. A method for producing crude oil from biomass by direct liquefaction under atmospheric pressure, said method comprising:
   a) introducing dried biomass into a reactor containing heavy oil to form a sump oil phase containing biomass and heavy oil;
   b) maintaining the temperature of the sump oil phase at a predetermined reaction temperature;
   c) condensing and collecting the volatile reaction products; and
   d) isolating and collecting the crude oil,
   wherein the heavy oil portion of the sump oil phase has at least 5 wt. % organically bound oxygen.

2. The method according to claim 1, wherein the biomass is continuously introduced into the reactor.

3. The method according to claim 1, wherein the reaction temperature is in the range from 250 to 550° C.

4. The method according to claim 1, wherein before introducing the biomass, the reactor is preheated to the reaction temperature.

5. The method according to claim 1, wherein the heavy oil is wood tar.

6. The method according to claim 1, wherein the heavy oil is wood tar with portions of tall oil.

7. The method according to claim 1, wherein the heavy oil is softwood tar.

8. The method according to claim 1, wherein the heavy oil is softwood tar with portions of tall oil.

9. The method according to claim 1, wherein the heavy oil is hardwood tar.

10. The method according to claim 1, wherein the heavy oil is hardwood tar with portions of tall oil.

11. A hydrophobic crude oil, produced according to the method of claim 1.

12. The hydrophobic crude oil according to claim 11, wherein said hydrophobic crude oil has a calorific value of ≥25 MJ/kg.

13. The method according to claim 1, wherein said method is conducted without addition of catalytic converters.

14. The method according to claim 1, wherein the resultant hydrophobic crude oil has a calorific value of ≥25 MJ/kg.

15. The method according to claim 1, wherein crushed dried biomass is fed by a conveying member directly into the sump oil phase.

16. The method according to claim 1, wherein said method is conducted without using an internal heavy oil cycle.

17. The method according to claim 13, wherein said method is conducted without using an internal heavy oil cycle.

* * * * *